United States Patent
Xu et al.

(10) Patent No.: US 10,021,103 B2
(45) Date of Patent: Jul. 10, 2018

(54) SERVICE AUTHORIZATION METHODS AND APPARATUSES

(71) Applicant: Samsung Electronics Co., Ltd., Suwon-si, Gyeonggi-do (KR)

(72) Inventors: Jinlin Xu, San Jose, CA (US); Haiqing Jiang, San Jose, CA (US); Varun Shimoga Prakash, Milpitas, CA (US); Arun Venkatesan, San Jose, CA (US); Renuka Srinivasan, Milpitas, CA (US); Xinwen Zhang, San Ramon, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 99 days.

(21) Appl. No.: 14/555,981

(22) Filed: Nov. 28, 2014

(65) Prior Publication Data

US 2015/0244724 A1    Aug. 27, 2015

Related U.S. Application Data

(60) Provisional application No. 61/942,963, filed on Feb. 21, 2014.

(51) Int. Cl.
*H04L 29/06* (2006.01)
*G06F 21/62* (2013.01)

(52) U.S. Cl.
CPC .......... *H04L 63/10* (2013.01); *G06F 21/6218* (2013.01); *H04L 63/20* (2013.01)

(58) Field of Classification Search
CPC ...... G06F 21/6218; H04L 63/20; H04L 63/10
See application file for complete search history.

(56) References Cited

U.S. PATENT DOCUMENTS

| | | | |
|---|---|---|---|
| 8,046,378 B1* | 10/2011 | Zhuge | G06F 17/30082 707/783 |
| 9,380,562 B1* | 6/2016 | Vetter | H04W 68/12 |
| 2008/0127354 A1 | 5/2008 | Carpenter et al. | |
| 2008/0134286 A1 | 6/2008 | Amdur et al. | |
| 2008/0209221 A1* | 8/2008 | Vennelakanti | H04L 63/062 713/183 |
| 2012/0222083 A1 | 8/2012 | Vaehae-Sipilae et al. | |
| 2013/0110857 A1* | 5/2013 | Chen | H04L 12/2887 707/758 |
| 2014/0149737 A1* | 5/2014 | Kulkarni | G06F 9/468 713/156 |

(Continued)

OTHER PUBLICATIONS

EAdroid: Providing Environment Adaptive Security for Android System, H Liang, Y Dong, B Wang, S Liu—Information Security and Cryptology, 2013—Springer, pp. 1-411.*

(Continued)

*Primary Examiner* — Mohammad A Siddiqi
(74) *Attorney, Agent, or Firm* — Jefferson IP Law, LLP

(57) ABSTRACT

An apparatus and method to authorize Application Programming Interface (API) or method level access in system and application services are provided. The method includes receiving a request for access to a service from another service or an application via an interface accessible by the other service or the application, and determining whether to authorize the request based at least in part on a specified policy.

20 Claims, 5 Drawing Sheets

(56) References Cited

U.S. PATENT DOCUMENTS

| | | | |
|---|---|---|---|
| 2014/0228001 A1* | 8/2014 | Kulkarni | H04L 63/10 455/411 |
| 2014/0237129 A1* | 8/2014 | Castro Castro | H04L 12/14 709/228 |
| 2014/0282608 A1* | 9/2014 | Biancalana | G06F 9/544 719/312 |
| 2014/0365781 A1* | 12/2014 | Dmitrienko | G06F 21/34 713/185 |
| 2015/0006135 A1* | 1/2015 | Deb | G06F 8/34 703/6 |
| 2015/0100890 A1* | 4/2015 | Kosmiskas | G06F 8/61 715/744 |

OTHER PUBLICATIONS

Security Enhanced (SE) Android: Bringing Flexible MAC to Android. S Smalley, R Craig—NDSS, 2013—cs.columbia.edu, 1-18 pages.*

Sven Bugiel, Stephan Heuser, Ahmad-Reza Sadeghi; Towards a Framework for Android Security Modules: Extending SE Android Type Enforcement to Android Middleware; Intel Collaborative Research Institute for Secure Computing; Dec. 5, 2012; 1-35 pages.*

* cited by examiner

SERVICE AUTHORIZATION METHODS AND APPARATUSES

CROSS-REFERENCE TO RELATED APPLICATION(S)

This application claims the benefit under 35 U.S.C. § 119(e) of a U.S. Provisional application filed on Feb. 21, 2014, in the U.S. Patent and Trademark Office and assigned Ser. No. 61/942,963, the entire disclosure of which is hereby incorporated by reference.

TECHNICAL FIELD

The present disclosure relates to an apparatus and method to authorize access to services or applications. More particularly, the present disclosure relates to an apparatus and method wherein the caller for signature or system based permissions can be any application.

BACKGROUND

Security solutions such as, for example, a version of SE for Android may provide signature or system based permissions check to identify a caller of APIs and methods. It also may use UID (User Identity) and PID (Process Identity) to identify the caller at run time. The disadvantage of the mechanism is that the caller for a signature or system based permissions check may be limited by two groups: system service or system app, and the signature should be the same with the service.

The UID cannot unique identify the application caller, since a single app on a different devices has different UID, thus cannot be used in pre-configured policy.

The PID will be changed at run-time, and it is not a strong credential to be used for authorization.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method to authorize access to services or applications In accordance with an aspect of the present disclosure, a method of authorizing access in system and application services is provided. The method includes receiving a request for access to a service from another service or an application via an interface accessible by the other service or the application, and determining whether to authorize the request based at least in part on a specified policy.

In accordance with another aspect of the present disclosure, a method of authorizing Application Programming Interface (API) or method level access in system and application services. The method includes receiving a service API call for a service, obtaining at least one of Process Identity (PID), User Identity (UID), package, SEInfo, or authorization information of a caller of the service API call, and determining whether SEInfo of the caller is authorized for an entirety of the service, and if so, responding to the call.

In accordance with another aspect of the present disclosure, an apparatus configured to authorize API or method level access in system and application services is provided. The apparatus includes a memory configured to store authorization information, at least one processor, and a Service-Keeper object configured to, when a service obtains an API or method call from another system service or app, receive queries regarding whether the system or application service needing API or method level control is authorized, to determine whether the API method is authorized, and to return a result.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of various embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
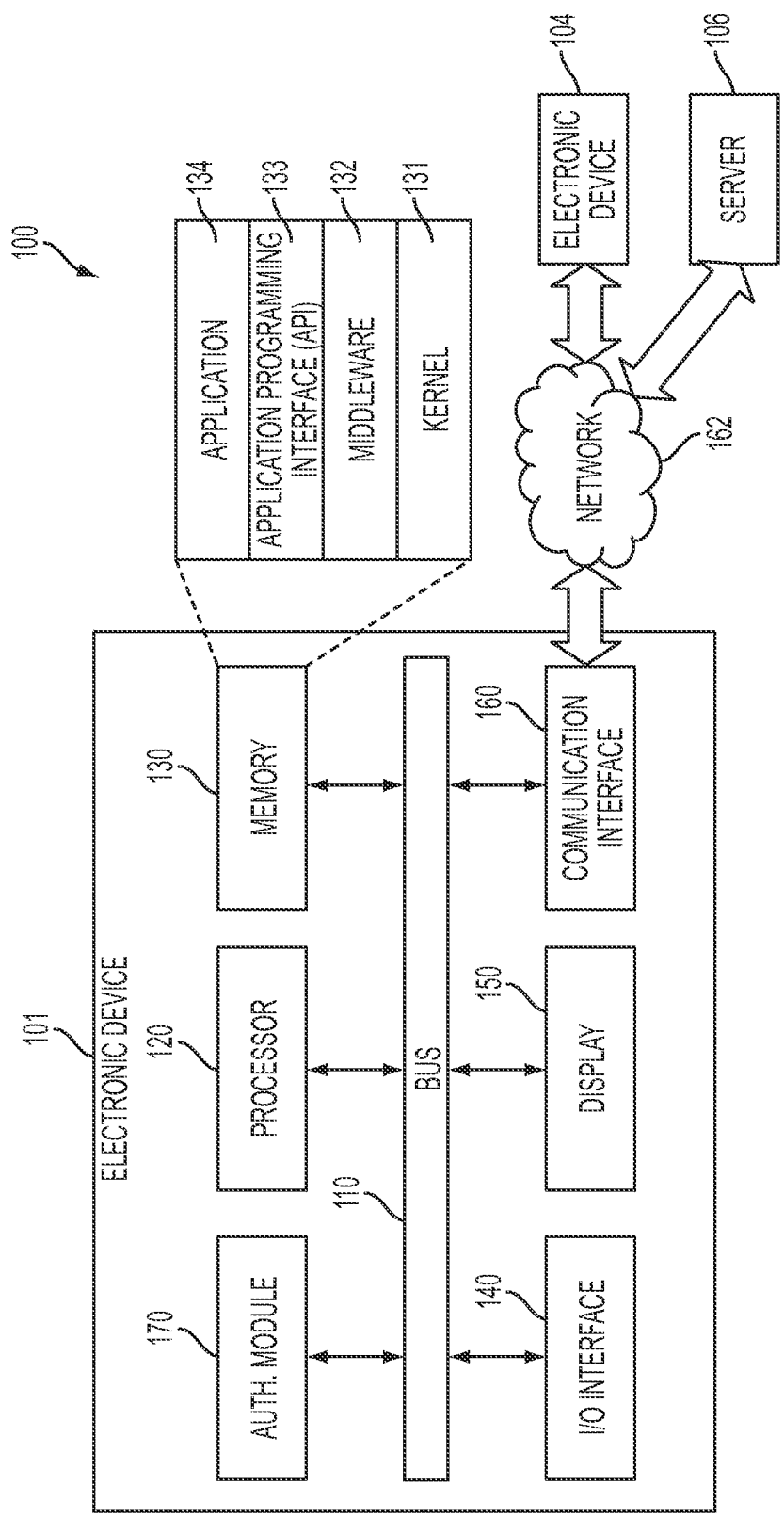
FIG. 1 illustrates a network environment including an electronic device according to various embodiments of the present disclosure.

Detailed descriptions of various aspects of the present disclosure will be discussed below with reference to the attached drawings. The descriptions are set forth as examples only, and shall not limit the scope of the present disclosure.

The detailed descriptions with reference to the accompanying drawings are provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions are omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the present disclosure are provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Terms as used in the present disclosure are used to describe the various embodiments of the present disclosure, and are not intended to limit the present disclosure. Singular terms are intended to include plural forms, unless the context makes it clear that plural forms are not intended.

Unless defined differently, all terms used in the present disclosure, including technical or scientific terms, have meanings that are understood generally by a person having ordinary skill in the art. Ordinary terms that may be defined in a dictionary should be understood to have the meaning consistent with their context, and unless clearly defined in the present disclosure, should not be interpreted to be excessively idealistic or formalistic.

According to various embodiments of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an MP3 player, a mobile medical device, a camera, a wearable device (e.g., a Head-Mounted Device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

Various embodiments of the present disclosure include an apparatus and method to authorize Application Programming Interface (API) or method level access in system and application services.

FIG. 1 illustrates a network environment including an electronic device according to various embodiments of the present disclosure.

Referring to FIG. 1, a network environment 100 includes an electronic device 101. The electronic device 101 may include a bus 110, a processor 120, a memory 130, an Input/Output (I/O) interface 140, a display 150, a communication interface 160, an authorization module 170, and/or the like.

The bus 110 may be circuitry that connect the foregoing components and allow communication between the foregoing components. For example, the bus 110 may connect components of the electronic device 101 so as to allow control messages and/or other information to be communicated between the connected components.

The processor 120 may, for example, receive instructions from other components (e.g., the memory 130, the I/O interface 140, the display 150, the communication interface 160, the authorization module 170, and/or the like), interpret the received instructions, and execute computation or data processing according to the interpreted instructions.

The memory 130 may, for example, store instructions and/or data that are received from, and/or generated by, other components (e.g., the memory 130, the I/O interface 140, the display 150, the communication interface 160, the authorization module 170, and/or the like). For example, the memory 130 may include programming modules such as a kernel 131, a middleware 132, an API 133, an application 134, and/or the like. Each of the foregoing programming modules may include a combination of at least two of software, firmware, or hardware.

The kernel 131 may control or manage system resources (e.g., the bus 110, the processor 120, the memory 130, and/or the like) that may be used in executing operations or functions implemented in other programming modules such as, for example, the middleware 132, the API 133, the application 134, and/or the like. The kernel 131 may provide an interface for allowing or otherwise facilitating the middleware 132, the API 133, the application 134, and/or the like, to access individual components of electronic device 101.

The middleware (or framework layer or system layer) 132 may be a medium through which the kernel 131 may communicate with the API 133, the application 134, and/or the like to send and receive data. The middleware 132 may control (e.g., scheduling, load balancing, and/or the like) work requests by the application 134. For example, the middleware 132 may control work requests by the application 134 by assigning priorities for using system resources (e.g., the bus 110, the processor 120, the memory 130, and/or the like) of the electronic device 101 to the application 134.

The API 133 may be an interface that may control functions that the application 134 may provide at the kernel 131, the middleware 132, and/or the like. For example, the API 133 may include at least an interface or a function (e.g., command) for file control, window control, video processing, character control, and/or the like.

According to various embodiments of the present disclosure, the application 134 may include a Short Message Service (SMS) application, a Multimedia Messaging Service (MMS) application, an email application, a calendar application, an alarm application, a health care application (e.g., an exercise amount application, a blood sugar level measuring application, and/or the like), an environmental information application (e.g., an application that may provide atmospheric pressure, humidity, temperature information, and/or the like), an instant messaging application, a call application, an internet browsing application, a gaming application, a media playback application, an image/video capture application, a file management application, and/or the like. In addition to or as an alternative to, the application 134 may be an application that is associated with information exchange between the electronic device 101 and an external electronic device (e.g., electronic device 104). As an example, the application 134 that is associated with the information exchange may include a notification relay application that may provide the external electronic device with a certain type of information, a device management application that may manage the external electronic device, and/or the like.

As an example, the notification relay application may include a functionality that provides notification generated by other applications at the electronic device 101 (e.g., the SMS/MMS application, the email application, the health care application, the environmental information application, the instant messaging application, the call application, the internet browsing application, the gaming application, the media playback application, the image/video capture application, the file management application, and/or the like) to an external electronic device (e.g., the electronic device 104). In addition to or as an alternative to, the notification relay application may provide, for example, receive notification from an external electronic device (e.g., the electronic device 104), and may provide the notification to a user.

As an example, the device management application may manage enabling or disabling of functions associated with least a portion of an external electronic device (e.g., the external electronic device itself, or one or more components of the external electronic device) in communication with the electronic device 101, controlling of brightness (or resolution) of a display of the external electronic device, an application operated at, or a service (e.g., a voice call service, a messaging service, and/or the like) provided by, the external electronic device, and/or the like.

According to various embodiments of the present disclosure, as an example, the application 134 may include one or more applications that are determined according to a property (e.g., type of electronic device, and/or the like) of the external electronic device (e.g., the electronic device 104). For example, if the external electronic device is an mp3 player, the application 134 may include one or more applications related to music playback. As another example, if the external electronic device is a mobile medical device, the application 134 may be a health care-related application. According to various embodiments of the present disclosure, the application 134 may include at least one of an application that is preloaded at the electronic device 101, an application that is received from an external electronic device (e.g., the electronic device 104, a server 106, and/or the like), and/or the like.

The I/O interface 140 may, for example, receive instruction and/or data from a user. The I/O interface 140 may send the instruction and/or the data, via the bus 110, to the processor 120, the memory 130, the communication interface 160, the authorization module 170, and/or the like. For example, the I/O interface 140 may provide data associated with user input received via a touch screen to the processor 120. The I/O interface 140 may, for example, output instructions and/or data received via the bus 110 from the processor 120, the memory 130, the communication interface 160, the authorization module 170, and/or the like, via an I/O device (e.g., a speaker, a display, and/or the like). For example, the I/O interface 140 may output voice data (e.g., processed using the processor 120) via a speaker.

The display 150 may display various types of information (e.g., multimedia, text data, and/or the like) to the user. As an example, the display 150 may display a Graphical User Interface (GUI) with which a user may interact with the electronic device 101.

The communication interface 160 may provide communication between the electronic device 101 and one or more external electronic devices (e.g., the electronic device 104, the server 106, and/or the like). For example, the communication interface 160 may communicate with the external electronic device by establishing a connection with a network 162 using wireless or wired communication. As an example, wireless communication with which the communication interface 160 may communicate may be at least one of, Wi-Fi, Bluetooth, Near Field Communication (NFC), Global Positioning System (GPS), cellular communication (e.g., Long Term Evolution (LTE), LTE Advanced (LTE-A), Code Division Multiple Access (CDMA), Wideband-CDMA (WDCMA), Universal Mobile Telecommunications System (UMTS), Wireless Broadband (WiBro), Global System for Mobile Communications (GSM), and/or the like), Infrared Data Association (IrDA) technology, and/or the like. As an example, wired communication with which the communication interface 160 may communicate may be at least one of, for example, Universal Serial Bus (USB), High Definition Multimedia Interface (HDMI), Recommended Standard 232 (RS-232), Plain Old Telephone Service (POTS), Ethernet, and/or the like.

According to various embodiments of the present disclosure, the network 162 may be a telecommunications network. As an example, the telecommunications network may include at least one of a computer network, the Internet, the Internet of Things, a telephone network, and/or the like. According to various embodiments of the present disclosure, a protocol (e.g., a transport layer protocol, a data link layer protocol, a physical layer protocol, and/or the like) for communicating between the electronic device 101 and an external electronic device may be supported by, for example, at least one of the application 134, the API 133, the middleware 132, the kernel 131, the communication interface 160, and/or the like.

Figure 2:
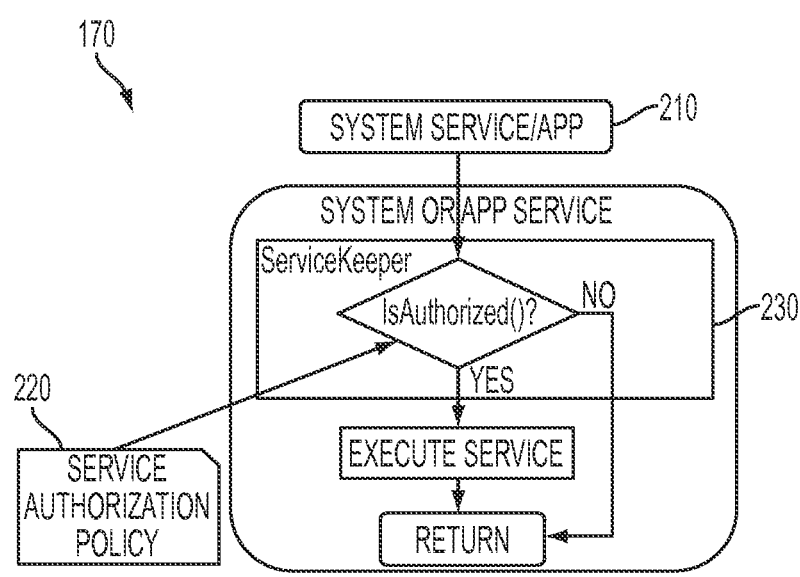
FIG. 2 illustrates a block diagram of the overall architecture of ServiceKeeper, according to various embodiments of the present disclosure.

The authorization module 170 may, for example, process at least a part of information received from other components (e.g., the processor 120, the memory 130, the I/O interface 140, the communication interface 160, and/or the like), and provide various information, services, and/or the like to the user in various manners. For example, the authorization module 170 may control via the processor 120 or independently at least some of the functions of the electronic device 101 to communicate or connect to another electronic device (e.g., the electronic device 104, the server 106, and/or the like). For example, the authorization module 170 may, check permissions of accessing APIs or methods requested by other modules. While FIG. 1 illustrates the authorization module 170 as a separate module, the authorization module 170 may also be integrated with the processor 120 and/or the memory 130, for example, in the middleware 132. FIG. 2 will provide additional information regarding the authorization module 170.

FIG. 2 illustrates a block diagram of the overall architecture of the authorization module 170, according to various embodiments of the present disclosure.

Referring to FIG. 2, the authorization module 170 may include a system service/application 210, a service authorization policy 220, a ServiceKeeper module 230, and/or the like.

A specific MDM (Mobile Device Management) client agent may want to call a specific method (for example, getAVCLog( )) defined in, for example, a Security Enhanced (SE) for Android Manager Service (SEAMS) API. The API may be implemented in SEAMS, which is a system service. A mechanism to identify the callers and give different permissions to different callers may be desired. For example, if the caller is an A agent, it only returns A related logs; if the caller is a B agent, it only returns B related logs. If the caller is not an MDM agent, execution is stopped. So a mechanism to identify the callers and give different permissions to them is desired.

According to an embodiment, the authorization module 170 may be implemented and deployed in the security service such as, for example, SEAMS. In general, the authorization module 170 can be applied on any handset with access control in system and application services. A service is an application component that can perform long-running operations in the background and does not provide a user interface in an operating system such as, for example, Android.

Using the ServiceKeeper, the caller doesn't need to be limited in system service, system app or the app that has the same signature as the callee. In another words, the caller can be any App.

The system or app service, which needs permissions of APIs or methods, can instantiate a ServiceKeeper object. Whenever the service obtains method call from another system service or app, it may check the ServiceKeeper's method, which in turn queries the embedded authorization policy file. If the policy allows the access, the ServiceKeeper returns yes, and the system or app service executes the called method. Otherwise, the execution is denied.

Figure 3:
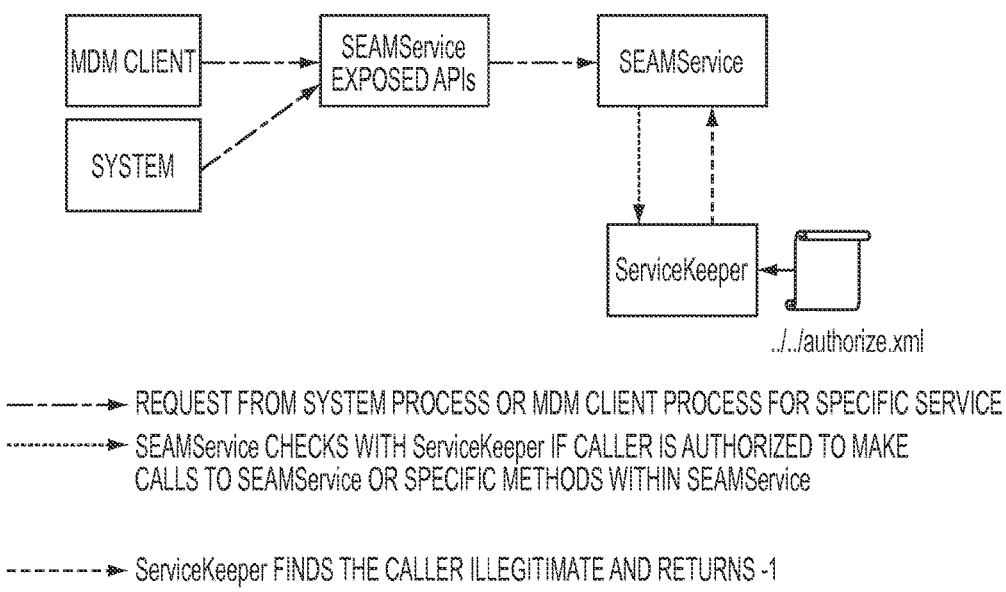
FIG. 3 illustrates an operation of ServiceKeeper, according to various embodiments of the present disclosure.

FIG. 3 shows an operation of ServiceKeeper according to various embodiments of the present disclosure.

While the present disclosure may describe the various embodiments with reference to Android, Android OS, or SEAndroid, the various embodiments are not limited thereto, and other systems, operating systems or security solutions may also be used.

In a security solution such as, for example, SEAndroid, the SEInfo of an app is a data structure maintained by the package manager service, which is mapped from the certificate that signs the app.

Each app in an operating system (e.g., Android) may be signed by a private key, and its corresponding public key certificate may be embedded in the app package (.apk). When the app package is being installed, the operating system first verifies the integrity of the apk with the public key. If it succeeds, the Package Manager Service (PMS) in Android maps the certificate to SEInfo, which is used in access control in SEAndroid. ServiceKeeper also may leverage this info for authorization.

The below XML file shows an example policy file. For example this policy file means that system service or App with com.android.abc as package name and abcinfo as SEInfo can access all methods defined in SEAndroid service. For example, the method getLog( ) in SEAMS can be called by any caller that has SEInfo persona or has package name as com.android.efg and SEInfo EFGInfo.

An example of authorized.xml is provided below:

```xml
<?xml version="1.0" encoding="utf-8"?>
<policy>
    <service name="seandroid">
        <seinfo value="system"/>
        <package name ="com.android.abc" seinfo = "abcinfo"/>
        <method name="getLog"/>
            <seinfo value = "persona"/>
            <package name ="com.android.efg" seinfo = "efginfo"/>
        </method>
    </service>
</policy>.
```

In this embodiment, SEAMS may be a system service, which can run as part of the system server process. It may expose variant APIs to multiple MDM clients and other system services. When a SEAMS API is invoked, the SEAMS service may obtain the calling app or service's PID, UID, and SEInfo, and query one of the ServiceKeeper's methods (for example, isAuthorized( )). The ServiceKeeper may check the loaded policy file (for example authorize.xml in FIG. 3), make a decision whether the access should be authorized or denied, and return a result to the SEAMS service (for example, if authorized it may return some identification info such as index, else it may return some negative notion such as −1). The SEAMS Service in turn may make a corresponding operation with the result.

Figure 4:
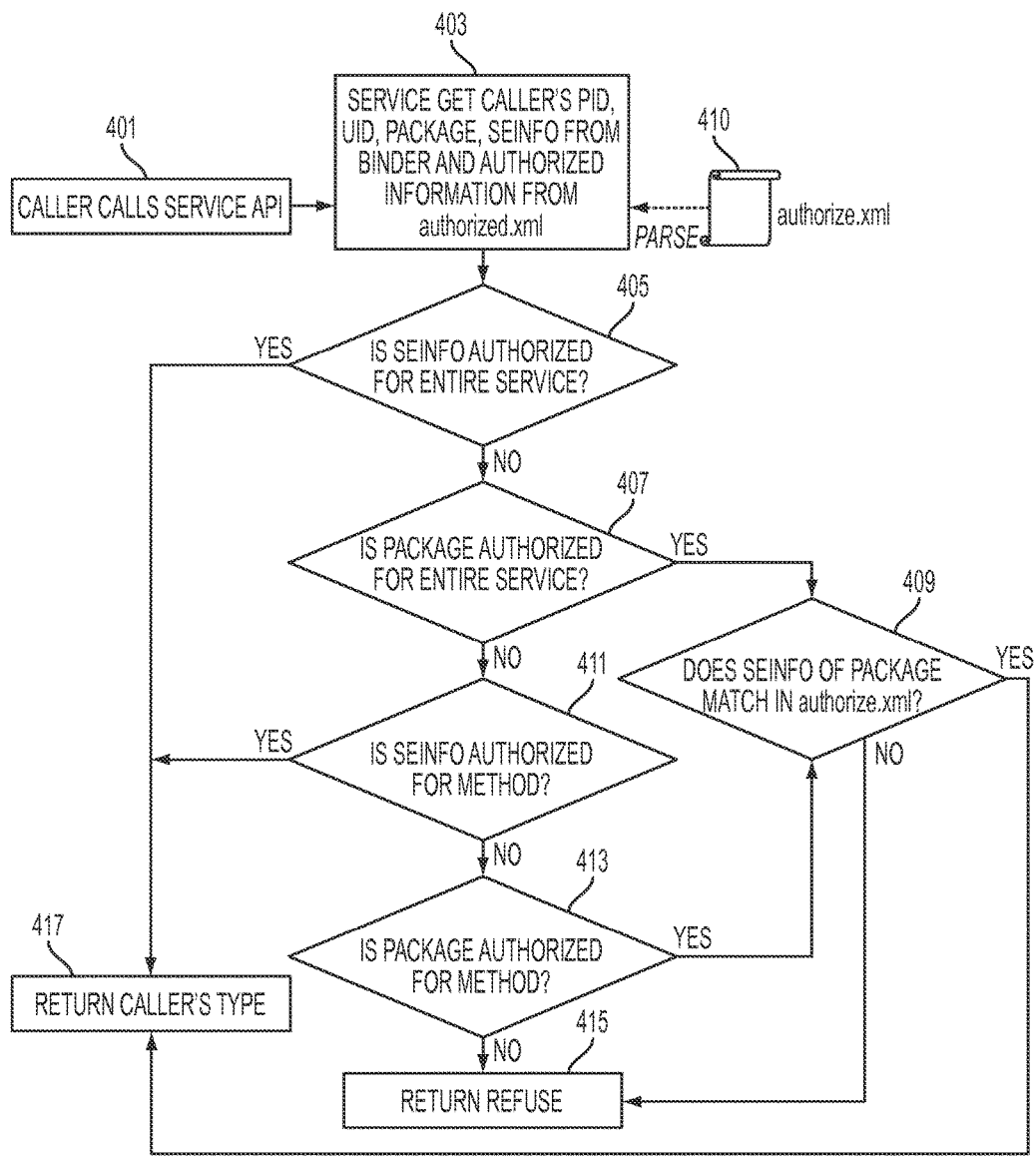
FIG. 4 illustrates an authorization check flow of Service-Keeper.

FIG. 4 shows an example authorization check operations that may be performed by the authorization module 170. In operation 401, a caller calls a service API.

In operation 403, the service may get the caller's PID, UID, package, and SEInfo from, for example, an interprocess communication mechanism or a remote method invocation system (e.g., an Android binder). The service may also get an authorization information from a database or a file (e.g., authorized.xml) For example, the authorization information may be parsed from authorize.xml 410.

In operation 405, checking may be made as to whether SEInfo is authorized for the entire service. If authorized, in operation 417, the caller's type may be returned.

If SEInfo is not authorized in operation 405, in operation 407, checking may be made as to whether the package is authorized for the entire service.

If the package is authorized in operation 407, in operation 409, the method may check whether SEInfo of the package matches in authorize.xml. If the SEInfo of the package matches, in operation 417, the caller's type may be returned. If the SEInfo of the package does not match, in operation 415, the service API call may be denied, for example, by returning a REFUSE command.

If the package is not authorized in operation 407, in operation 411, the present checking is made as to whether SEInfo is authorized for a method. If authorized, in operation 417, the caller's type may be returned. If not authorized, the present method proceeds to operation 413.

If the SEInfo is not authorized in operation 411, in operation 413, checking may be made as to whether the package is authorized for the method. If authorized, operation 409 may be performed. If not authorized, in operation 417, the service API call may be denied, for example, by returning the REFUSE command.

The ServiceKeeper solution may be implemented as part of a security platform product such as, for example, Knox™. The user can use it if protection is desired for methods in System Service and only a specific caller can access specific methods in the service, or if methods in, for example, Android App Service need to be protected and only a specific caller can access specific methods in Android App Service.

Figure 5:
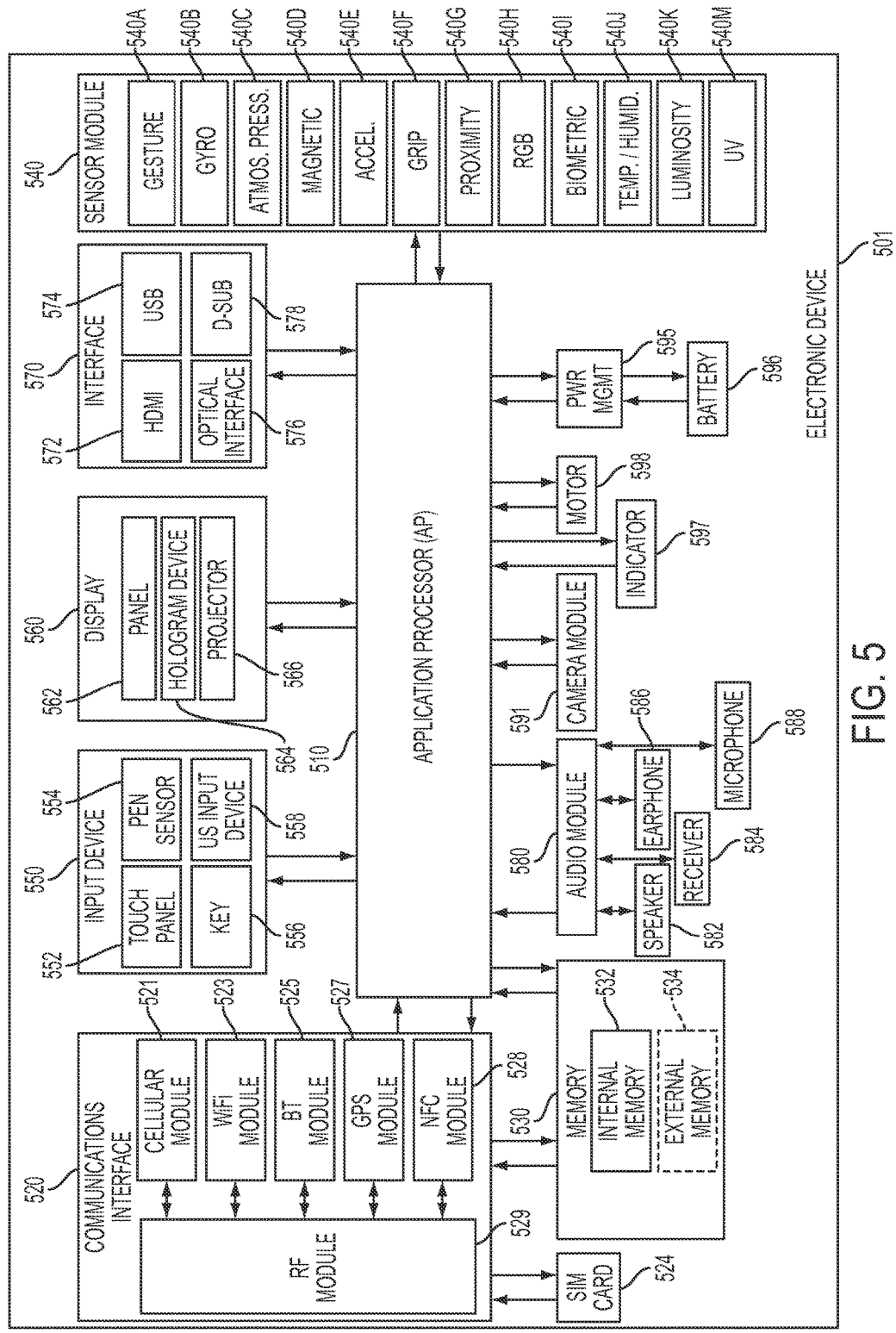
FIG. 5 illustrates a block diagram of hardware according to various embodiments of the present disclosure.

FIG. 5 illustrates a block diagram of hardware according to various embodiments of the present disclosure.

Referring to FIG. 5, an electronic device 501 may be, for example, a part or all of the electronic device 101. Referring to FIG. 5, the electronic device 501 may include one or more Application Processors (AP) 510, a communication interface 520, a Subscriber Identification Module (SIM) card 524, a memory 530, a sensor module 540, an input module 550, a display module 560, an interface 570, an audio module 580, a camera module 591, a power management module 595, a battery 596, an indicator 597, a motor 598, and/or the like.

The AP 510 may control one or more hardware or software components that are connected to the AP 510, perform processing or computation of data (including multimedia data), and/or the like. As an example, the AP 510 may be implemented as a System-on-Chip (SoC). The AP 510 may include a Graphics Processing Unit (GPU) (not shown).

The communication interface 520 (e.g., the communication interface 160) may transmit and receive data in communications between the electronic device 101 and other electronic devices (e.g., the electronic device 104, the server 106, and/or the like). As an example, the communication interface 520 may include one or more of a cellular module 521, a Wi-Fi module 523, a Bluetooth module 525, a GPS module 527, a NFC module 528, a Radio Frequency (RF) module 529, and/or the like.

The cellular module 521 may provide services such as, for example, a voice call, a video call, a Short Messaging Service (SMS), internet service, and/or the like, via a communication network (e.g., LTE, LTE-A, CDMA, WCDMA, UMTS, WiBro, GSM, and/or the like). As an example, the cellular module 521 may differentiate and authorize electronic devices within a communication network using a Subscriber Identification Module (SIM) card (e.g., the SIM card 524). According to various embodiments of the present disclosure, the cellular module 521 may perform at least a part of the functionalities of the AP 510. For example, the cellular module 521 may perform at least a part of multimedia control functionality.

According to various embodiments of the present disclosure, the communication interface 520 and/or the cellular module 521 may include a Communication Processor (CP). As an example, the cellular module 521 may be implemented as SoC.

Although FIG. 5 illustrates components such as the cellular module 521 (e.g., CP), the memory 530, the power management module 595 as components that are separate from the AP 510, according to various embodiments of the present disclosure, the AP 510 may include, or be integrated with, one or more of the foregoing components (e.g., the cellular module 521).

According to various embodiments of the present disclosure, the AP 510, the cellular module 521 (e.g., CP), and/or the like, may process instructions or data received from at least one of non-volatile memory or other components by loading in volatile memory. The AP 510, the cellular module 521, the communication interface 520, and/or the like, may store at non-volatile memory at least one of data that is received from at least one of other components or data that is generated by at least one of the other components.

Each of the Wi-Fi module 523, the Bluetooth module 525, the GPS module 527, the NFC module 528, and/or the like may, for example, include one or more processors that may process data received or transmitted by the respective modules. Although FIG. 5 illustrates the cellular module 521, the Wi-Fi module 523, the Bluetooth module 525, the GPS module 527, and the NFC module 528 as separate blocks, according to various embodiments of the present disclosure, any combination (e.g., two or more) of the cellular module 521, the Wi-Fi module 523, the Bluetooth module 525, the GPS module 527, the NFC module 528, and/or the like may be included in an Integrated Chip (IC) or an IC package. For example, at least some of the processors corresponding to the respective the cellular module 521, the Wi-Fi module 523, the Bluetooth module 525, the GPS module 527, the NFC module 528, and/or the like, may be implemented as a single SoC. For example, a CP corresponding to the cellular module 521 and a Wi-Fi processor corresponding to Wi-Fi module 523 may be implemented as a single SoC.

The RF module 529 may, for example, transmit and receive RF signals. Although not shown, the RF module 529 may include a transceiver, a Power Amp Module (PAM), a frequency filter, a Low Noise Amplifier (LNA), and/or the like. The RF module 529 may include one or more components for transmitting and receiving Electro-Magnetic (EM) waves (e.g., in free space or the like) such as, for example, conductors or conductive wires. Although FIG. 5 illustrates that the cellular module 521, the Wi-Fi module 523, the Bluetooth module 525, the GPS module 527, and the NFC module 528 are sharing the RF module 529, according to various embodiments of the present disclosure, at least one of the cellular module 521, the Wi-Fi module 523, the Bluetooth module 525, the GPS module 527, the NFC module 528, and/or the like may transmit and receive RF signals via a separate RF module.

The SIM card 524 may be a card implementing a SIM, and may be configured to be inserted into a slot disposed at a specified location of the electronic device. The SIM card 524 may include a unique identifier (e.g., Integrated Circuit Card IDentifier (ICCID)) subscriber information (e.g., International Mobile Subscriber Identity (IMSI)), and/or the like.

The memory 530 (e.g., the memory 130) may include an internal memory 532, an external memory 534, or a combination thereof.

According to various embodiments of the present disclosure, the internal memory 532 may be, for example, at least one of volatile memory (e.g., Dynamic Random Access Memory (DRAM), Static Random Access Memory (SRAM) or Synchronous Dynamic Random Access Memory (SDRAM)), non-volatile memory (e.g., One Time Programmable Read Only Memory (OTPROM), Programmable Read Only Memory (PROM), Erasable and Programmable Read Only Memory (EPROM), Electrically Erasable and Programmable Read Only Memory (EEPROM), mask Read Only Memory (ROM), flash ROM, NAND flash memory, NOR flash memory), and/or the like.

According to various embodiments of the present disclosure, the internal memory 532 may be a Solid State Drive (SSD). As an example, the external memory 534 may be a flash drive (e.g., Compact Flash (CF drive), Secure Digital (SD), micro Secure Digital (micro-SD), mini Secure Digital (mini-SD), extreme Digital (xD), Memory Stick, and/or the like). The external memory 534 may be operatively coupled to the electronic device 501 via various interfaces. According to various embodiments of the present disclosure, the electronic device 501 may include recording devices (or recording media) such as, for example, Hard Disk Drives (HDD), and/or the like.

The sensor module 540 may measure physical/environmental properties detect operational states associated with the electronic device 501, and/or the like, and convert the measured and/or detected information into signals such as, for example, electric signals or electromagnetic signals. As an example, the sensor module 540 may include at least one of a gesture sensor 540A, a gyro sensor 540B, an atmospheric pressure sensor 540C, a magnetic sensor 540D, an accelerometer 540E, a grip sensor 540F, a proximity sensor 540G, an RGB sensor 540H, a biometric sensor 540I, a temperature/humidity sensor 540J, a luminosity sensor 540K, a Ultra Violet (UV) sensor 540M, and/or the like. The sensor module 540 may detect the operation state of the electronic device and/or measure physical properties, and convert the detected or measured information into electrical signals. Additionally or alternatively, the sensor module 540 may also include, for example, an electrical-nose sensor (not shown), an electromyography (EMG) sensor (not shown), an electroencephalogram (EEG) sensor (not shown), an infrared (IR) sensor (not shown), an eye-scanning sensor (e.g., iris sensor) (not shown), a fingerprint sensor, and/or the like. The sensor module 540 may also include control circuitry for controlling one or more sensors included therein.

The input module 550 may include a touch panel 552, a (digital) pen sensor 554, a key 556, an ultrasonic input device 558, and/or the like.

As an example, the touch panel 552 may detect touch input using capacitive, resistive, infrared, ultrasonic methods, and/or the like. The touch panel 552 may also include a touch panel controller (not shown). As an example, a capacitive-type touch panel may detect proximity inputs (e.g. hovering input) in addition to, or as an alternative to, physical touch inputs. The touch panel 552 may also include a tactile layer. According to various embodiments of the present disclosure, the touch panel 552 may provide haptic feedback to the user using the tactile layer.

As an example, the (digital) pen sensor 554 may be implemented using methods identical to or similar to receiving a touch input from a user, or using a separate detection sheet (e.g., a digitizer).

As an example, the key 556 may be a keypad, a touch key, and/or the like.

As an example, the ultrasonic input device 558 may be a device configured to identify data by detecting, using a microphone (e.g., microphone 588), ultrasonic signals generated by a device capable of generating the ultrasonic signal. The ultrasonic input device 558 may detect data wirelessly.

According to various embodiments of the present disclosure, the electronic device 501 may receive user input from an external device (e.g., a network, computer or server) connected to the electronic device 501 using the communication interface 520.

The display module 560 (e.g., the display 150) may include a panel 562, a hologram device 564, a projector 566, and/or the like. As an example, the panel 562 may be, for example, a Liquid-Crystal Display (LCD), an Active-Matrix Organic Light-Emitting Diode (AM-OLED) display, and/or the like. As an example, the panel 562 may be configured to be flexible, transparent, and/or wearable. The panel 562 and the touch panel 552 may be implemented as a single module. The hologram device 564 may provide a three-dimensional image. For example, the hologram device 564 may utilize the interference of light waves to provide a three-dimensional image in empty space. The projector 566 may provide image by projecting light on a surface (e.g., a wall, a screen, and/or the like). As an example, the surface may be positioned internal or external to the electronic device 501. According to various embodiments of the present disclosure, the display module 560 may also include a control circuitry for controlling the panel 562, the hologram device 564, the projector 566, and/or the like.

The interface 570 may include, for example, one or more interfaces for a High-Definition Multimedia Interface (HDMI) 572, a Universal Serial Bus (USB) 574, a projector 576, or a D-subminiature (D-sub) 578, and/or the like. As an example, the interface 570 may be part of the communication interface 520. Additionally or alternatively, the interface 570 may include, for example, one or more interfaces for Mobile High-definition Link (MHL), Secure Digital (SD)/MultiMedia Card (MMC), Infrared Data Association (IrDA), and/or the like.

The audio module 580 may encode/decode sound into electrical signal, and vice versa. According to various embodiments of the present disclosure, at least a portion of audio module 580 may be part of the I/O interface 140. As an example, the audio module 580 may encode/decode voice information that is input into, or output from, the speaker 582, the receiver 584, the earphone 586, the microphone 588, and/or the like.

The camera module 591 may capture still images and/or video. According to various embodiments of the present disclosure, the camera module 591 may include one or more image sensors (e.g., front sensor module, rear sensor module, and/or the like) (not shown), an Image Signal Processor (ISP) (not shown), or a flash (e.g., Light-Emitting Diode (flash LED), xenon lamp, and/or the like) (not shown).

The power management module 595 may manage electrical power of the electronic device 501. Although not shown, the power management module 595 may include, for example, a Power Management Integrated Circuit (PMIC), a charger Integrated Circuit (charger IC), a battery gauge, a fuel gauge, and/or the like.

As an example, the PMIC may be disposed in an integrated circuit or an SoC semiconductor. The charging method for the electronic device 501 may include wired or wireless charging. The charger IC may charge a battery, may prevent excessive voltage or excessive current from a charger from entering the electronic device 501, and/or the like. According to various embodiments of the present disclosure, the charger IC may include at least one of a wired charger IC or a wireless charger IC. As an example, the wireless charger IC may be a magnetic resonance type, a magnetic induction type, an electromagnetic wave type, and/or the like. As an example, the wireless charger IC may include circuits such as a coil loop, a resonance circuit, a rectifier, and/or the like.

As an example, the battery gauge may measure a charge level, a voltage while charging, a temperature of battery 596, and/or the like.

As an example, the battery 596 may supply power to the electronic device 501. As an example, the battery 596 may be a rechargeable battery, a solar battery, and/or the like.

The indicator 597 may indicate one or more states (e.g., boot status, message status, charge status, and/or the like) of the electronic device 501 or a portion thereof (e.g., the AP 510). Motor 598 may convert an electrical signal into a mechanical vibration.

Although not shown, the electronic device 501 may include one or more devices for supporting mobile television (mobile TV) (e.g., a Graphics Processing Unit (GPU)), and/or the like. The devices for supporting mobile TV may support processing of media data compliant with, for example, Digital Multimedia Broadcasting (DMB), Digital Video Broadcasting (DVB), media flow, and/or the like.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents. Various embodiments of the present disclosure are described as examples only and are noted intended to limit the scope of the present disclosure. Accordingly, the scope of the present disclosure should be understood as to include any and all modifications that may be made without departing from the technical spirit of the present disclosure.

What is claimed is:

1. A method of authorizing access in system and application services in a computer device comprising at least one hardware processor, the method comprising:
   receiving a request for access to a system or application service, wherein the request is received from another service or from an application via an interface accessible by the other service or the application;
   determining whether to authorize the request based at least in part on a specified policy;
   providing the requested access, based on the determining of whether the request is authorized, to the requesting other service or application; and
   displaying, if the requested access is determined to not be authorized, an input to modify the specified policy to allow the requested access,
   wherein the request includes user identity (UID) information uniquely identifying a user,
   wherein the specified policy comprises an entry in a file,
   wherein the specified policy is dynamically configurable during runtime by modifying the entry in the file,
   wherein the specified policy comprises a determination of whether the access to the service by the other service or application is authorized, based on the UID information,
   wherein a separate policy is specified for each service to which access is requested, and
   wherein each policy specifies callers that are authorized to access the corresponding service.

2. The method of claim 1, wherein the determining is performed at an SEAndroid Manager Service (SEAMS).

3. The method of claim 2, wherein SEAMS comprises a system service, running as part of a system server process.

4. The method of claim 1, further comprising:
   when the interface is accessed, obtaining information of the other service or the application,
   wherein the determining comprises determining whether to authorize the request based at least in part on the policy file storing the specified policy and the information of the other service or the application.

5. The method of claim 4, wherein the information comprises the other service's or application's process identity (PID), the UID information, and SEInfo.

6. The method of claim 1, wherein access to the service is refused if a caller is not determined authorized to access the corresponding service.

7. A non-transitory computer-readable storage medium encoded with instructions to cause a digital computer comprising at least one hardware processor to execute a method of authorizing access in system and application services, the method comprising:
   receiving a request for access to a system or application service, wherein the request is received from another service or from an application via an interface accessible by the other service or the application;
   determining whether to authorize the request based at least in part on a specified policy;
   providing the requested access, based on the determining of whether the request is authorized, to the requesting other service or application; and
   displaying, if the requested access is determined to not be authorized, an input to modify the specified policy to allow the requested access,
   wherein the request includes user identity (UID) information uniquely identifying a user,
   wherein the specified policy comprises an entry in a file,
   wherein the specified policy is dynamically configurable during runtime by modifying the entry in the file,
   wherein the specified policy comprises a determination of whether the access to the service by the other service or application is authorized, based on the UID information,
   wherein a separate policy is specified for each service to which access is requested, and
   wherein each policy specifies callers that are authorized to access the corresponding service.

8. A method of authorizing Application Programming Interface (API) or method level access in system and application services in a computer device comprising at least one hardware processor, the method comprising:
   receiving a service API call for a system or application service;
   obtaining at least one of process identity (PID), user identity (UID), package, SEInfo, or authorization information of a caller of the service API call;
   determining whether SEInfo of the caller is authorized for an entirety of the service; and responding to the call based on determining of whether the SEInfo of the caller is authorized for the entirety of the service, wherein the specified policy comprises an entry in a file, wherein the specified policy is dynamically configurable during runtime by modifying the entry in the file, wherein a separate policy is specified for each service to which access is requested, and wherein each policy specifies callers that are authorized to access the corresponding service.

9. The method of claim 8, further comprising, if the SEInfo of the caller is authorized for the entirety of the service, returning the authorized caller's type.

10. The method of claim 8, further comprising, if the SEInfo of the caller is determined not authorized for the entirety of the service, determining whether a package of the caller is authorized for the entirety of the service.

11. The method of claim 10, further comprising, if the package is authorized for the entire service, returning the authorized caller's type.

12. The method of claim 11, further comprising, if the package of the caller is determined not authorized for the entirety of the service, returning responding to the call if the SEInfo of the caller is authorized for a method of the service.

13. The method of claim 12, further comprising, if the SEInfo of the caller is determined not authorized for the method, returning responding to the call if the package is authorized for the method.

14. The method of claim 13, further comprising, if the package of the caller is determined not authorized for the method, responding REFUSE to the call.

15. An apparatus configured to authorize Application Programming Interface (API) or method level access in system and application services in the apparatus, the apparatus comprising:

a memory configured to store authorization information;

at least one processor configured to:

receive, when a service obtains an API or method call from another system service or app, queries regarding whether the system or application service calling API or method level access is authorized, determine whether the API or method level access is authorized, and return a result based on a determination of whether the API or method level access is authorized, wherein the determining of whether the API or method level access is authorized comprises checking a specified policy, wherein the specified policy comprises an entry in an authorization file, wherein the specified policy is dynamically configurable during runtime by modifying the entry in the authorization file, wherein a separate policy is specified for each service to which access is requested, and wherein each policy specifies callers that are authorized to access the corresponding service.

16. The apparatus of claim 15, wherein the determining of whether access to the API or method is authorized comprises querying the embedded authorization file.

17. The apparatus of claim 16, wherein a separate authorization file is stored in the memory for each API or method.

18. The apparatus of claim 17, wherein each authorization file specifies callers authorized to access the corresponding API or method.

19. The apparatus of claim 18, wherein the at least one processor is further configured to refuse access to the corresponding API or method if a caller is not determined authorized to access the API or method.

20. The apparatus of claim 15, wherein the at least one processor is further configured to:

return, if access to the API or method level access is authorized, a result that enables execution, and return, if the access to the API or method level access is not authorized, a result that denies execution.

* * * * *